(12) United States Patent
Christensen et al.

(10) Patent No.: US 11,441,957 B2
(45) Date of Patent: Sep. 13, 2022

(54) INDICATOR CLIP FOR DETERMINING THE TENSION OR PRESSURE IN A RETENTION MECHANISM AND METHOD OF USE THEREOF

(71) Applicant: Panduit Corp., Tinley Park, IL (US)

(72) Inventors: Kenneth A. Christensen, Naperville, IL (US); Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 668 days.

(21) Appl. No.: 16/458,311

(22) Filed: Jul. 1, 2019

(65) Prior Publication Data

US 2020/0003644 A1    Jan. 2, 2020

Related U.S. Application Data

(60) Provisional application No. 62/692,974, filed on Jul. 2, 2018.

(51) Int. Cl.
*G01L 5/00* (2006.01)
*G01L 5/06* (2006.01)
*B65D 63/14* (2006.01)

(52) U.S. Cl.
CPC ............... *G01L 5/06* (2013.01); *B65D 63/14* (2013.01)

(58) Field of Classification Search
CPC .................................. G01L 5/06; B65D 63/14
See application file for complete search history.

(56) References Cited

U.S. PATENT DOCUMENTS

| | | | |
|---|---|---|---|
| 3,861,205 A * | 1/1975 | Frey | A63C 11/265 73/862.02 |
| 4,015,311 A | 4/1977 | Curtis | |
| 4,765,032 A | 8/1988 | Fortsch | |
| 4,868,953 A | 9/1989 | Fortsch | |
| 5,129,350 A | 7/1992 | Marelin | |
| 5,212,928 A | 5/1993 | Scott et al. | |
| 5,568,951 A * | 10/1996 | Morgan | B65D 55/02 292/307 A |
| 5,628,348 A | 5/1997 | Scott et al. | |
| 5,647,407 A | 7/1997 | Scott et al. | |
| 6,014,792 A | 1/2000 | Marelin et al. | |
| 7,484,274 B2 | 2/2009 | Nelson et al. | |
| 8,146,212 B2 | 4/2012 | Nelson et al. | |
| 8,819,899 B2 | 9/2014 | Fietkiewicz | |
| 2004/0168522 A1* | 9/2004 | Fernald | G01F 1/666 73/861.01 |
| 2007/0251314 A1* | 11/2007 | Molenaar | G01F 1/662 73/201 |
| 2010/0326219 A1* | 12/2010 | Nelson | G09F 3/0295 24/16 R |
| 2014/0251730 A1* | 9/2014 | Bisset | E01D 22/00 182/150 |

(Continued)

*Primary Examiner* — Max H Noori
(74) *Attorney, Agent, or Firm* — Christopher S. Clancy; James H. Williams; Peter S. Lee

(57) ABSTRACT

An indicator clip for use with a retention mechanism. The indicator clip includes a body with a channel that is configured to accept a strap from the retention mechanism, and further including at least one extension that is configured to deflect when a force is applied to the retention mechanism. The indicator clip is configured to measure the force applied to the retention mechanism.

10 Claims, 5 Drawing Sheets

(56) References Cited

U.S. PATENT DOCUMENTS

| | | | |
|---|---|---|---|
| 2015/0235821 A1* | 8/2015 | Madocks | F16B 2/08 |
| | | | 269/130 |
| 2016/0030696 A1* | 2/2016 | Klenner | A61M 16/0683 |
| | | | 128/207.18 |
| 2016/0363145 A1* | 12/2016 | De Vittorio | B65D 63/06 |
| 2017/0254457 A1* | 9/2017 | Koehler | F16L 33/08 |
| 2019/0053723 A1* | 2/2019 | van Sparrentak | A61B 5/6828 |
| 2022/0094652 A1* | 3/2022 | Lankage | H04L 51/046 |
| 2022/0099120 A1* | 3/2022 | Spearing | F16B 5/0621 |

\* cited by examiner

INDICATOR CLIP FOR DETERMINING THE TENSION OR PRESSURE IN A RETENTION MECHANISM AND METHOD OF USE THEREOF

CROSS REFERENCE TO RELATED APPLICATION

This application claims priority to U.S. Provisional Application No. 61/692,974, filed Jul. 2, 2018, the subject matter of which is hereby incorporated by reference in its entirety.

FIELD OF THE INVENTION

The present invention relates to a tension indicator clip for displaying the tension or pressure in an installed cable tie.

BACKGROUND OF THE INVENTION

Retention mechanisms, such as cable ties, are well-known for use in the Oil and Gas industry and Shipbuilding industry. Cable ties may be used in a number of different applications, such as: the application of cable bundling or fastening, pipe or hose fastening, as well as retaining rubber boots in place on an axle. Cable ties of conventional construction include a cable tie head and an elongated tail extending therefrom. The tail is wrapped around a selected application object and thereafter inserted through a passage in the head. The head of the cable tie typically supports a locking element which extends into the head passage and engages the body of the tail to secure the tail to the head. In practice, the installer manually places the cable tie about the application object, inserts the tail through the head passage and then manually tightens the cable tie about the selected object. The cable tie is usually further tightened to attach the cable in tension. In certain uses, the amount of tension or pressure in the cable tie is desired to be set to a specific amount.

Existing products and methods of measuring applied tension reside in the use of a cable tie installation tool such as the one disclosed in U.S. Pat. No. 6,206,053 B1 assigned to Panduit Corp. A cable tie installation tool tightens the cable tie to the desired tension. The cable tie installation tool typically includes a hand grip that is squeezed to add sufficient tension to the cable tie. The tension or pressure of the cable tie is displayed on an indicator of the cable tie installation tool. The cable tie installation tool is a specific tool that is used to measure and display the applied tension or pressure of an installed cable tie. Existing products and methods measure the tension or pressure of the cable tie at the time of installation. After installation, the tension or pressure of the cable tie may change due to environment, use, vibration, or other factors. Existing products and methods require the use of the cable tie installation tool and the like to determine tension or pressure. Further, existing products and methods do not provide for a continued tension or pressure measurement of an installed cable tie.

SUMMARY OF THE INVENTION

The present invention addresses the problems and shortcomings of existing products. The present invention allows allow for the installation of a cable tie or strap to a specific tension without the use of a specific tool to measure tension in a cable tie. Additionally, the present invention continually measures tension in a cable tie after installation to an application.

BRIEF DESCRIPTION OF THE DRAWINGS

Objects, features, and advantages of the present invention will become apparent upon reading the following description in conjunction with the drawing figures in which.

DETAILED DESCRIPTION

The disclosed indicator clip solves or improves upon one or more of the above noted and/or other problems and disadvantages with prior products and methods. The indicator clip allows the tension or pressure in a cable tie to be measured without the use of a tool. The indicator clip further allows for the tension or pressure in an installed cable tie to be continually measured.

Figure 1:
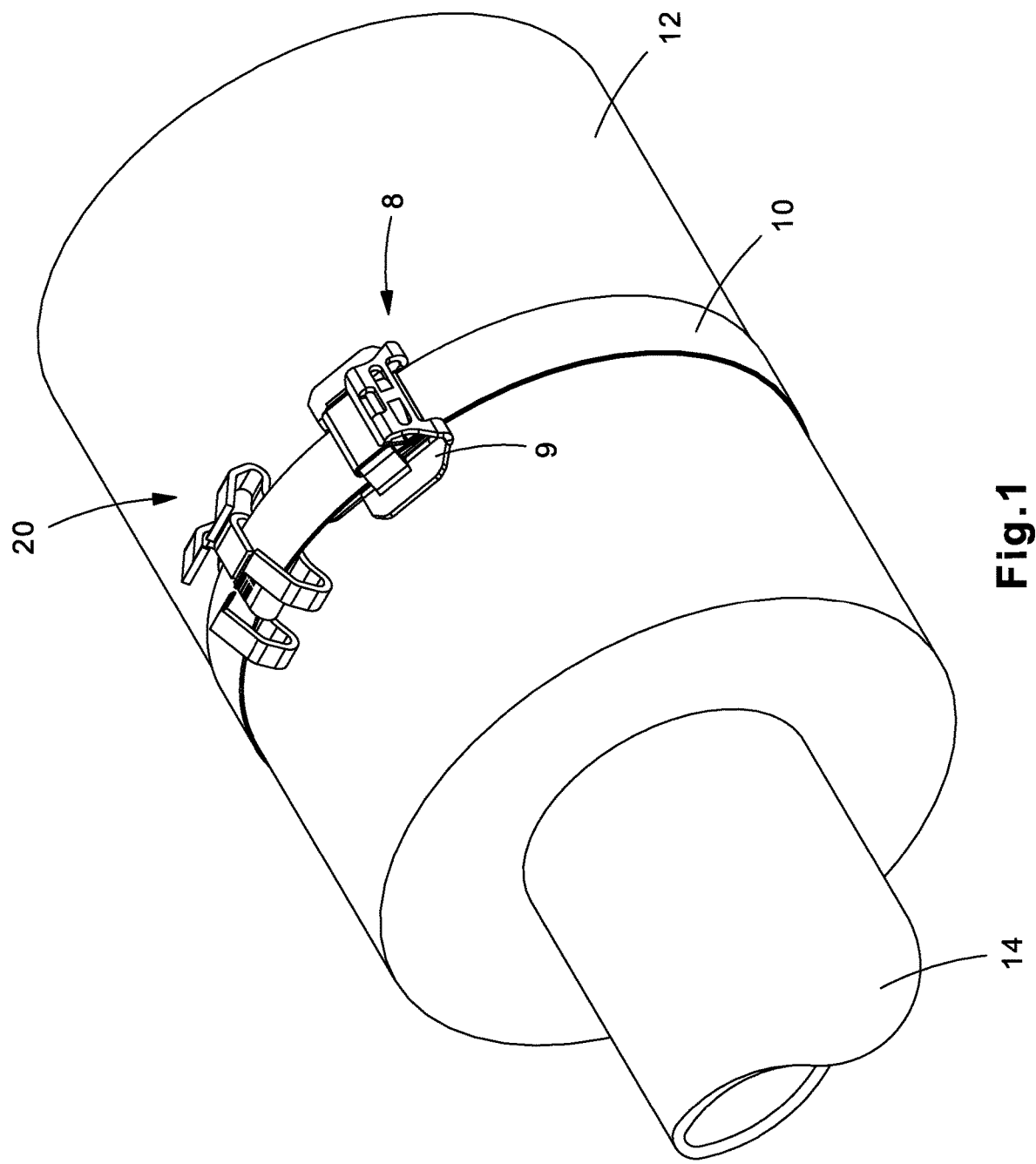
FIG. 1 depicts a perspective view of an indicator clip for a cable tie installed on a rubber boot protecting an axle.
Figure 2:
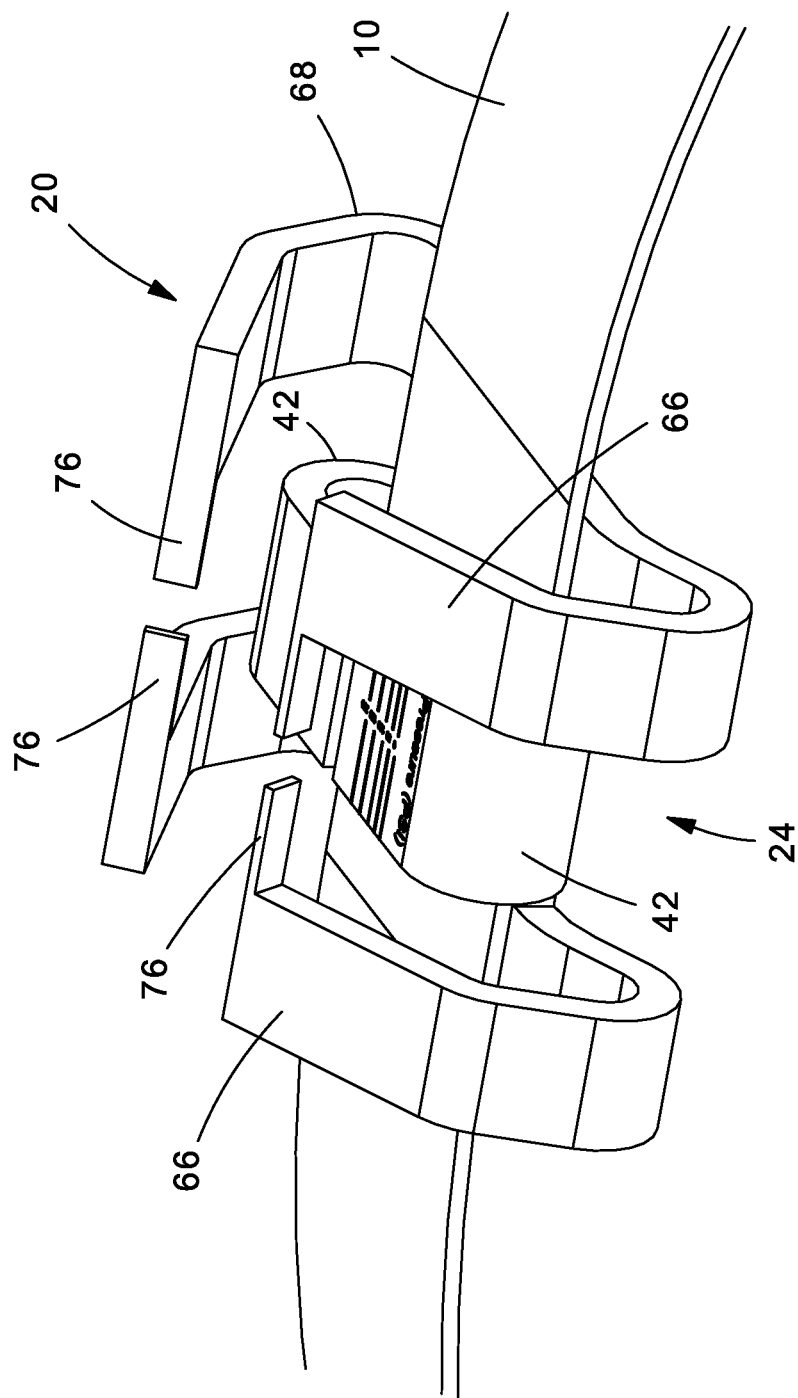
FIG. 2 depicts a top perspective view of the indicator clip and cable tie of FIG. 1.

Turning now to the drawings, FIG. 1 depicts one example of an indicator clip 20 installed on a cable tie 8 retention mechanism. The combination of the indicator clip 20 installed upon the cable tie 8 forms a fastening system. As depicted in FIG. 1, the cable tie 8 is installed on a portion of a rubber boot 12 disposed over an axle 14. The cable tie 8 includes a head 9 and a strap body 10. The indicator clip 20 is installed on the strap body 10 of the cable tie 8. FIG. 2 depicts a detailed perspective of the indicator clip 20 and the interaction with the strap body 10 of the cable tie 8.

Figure 3:
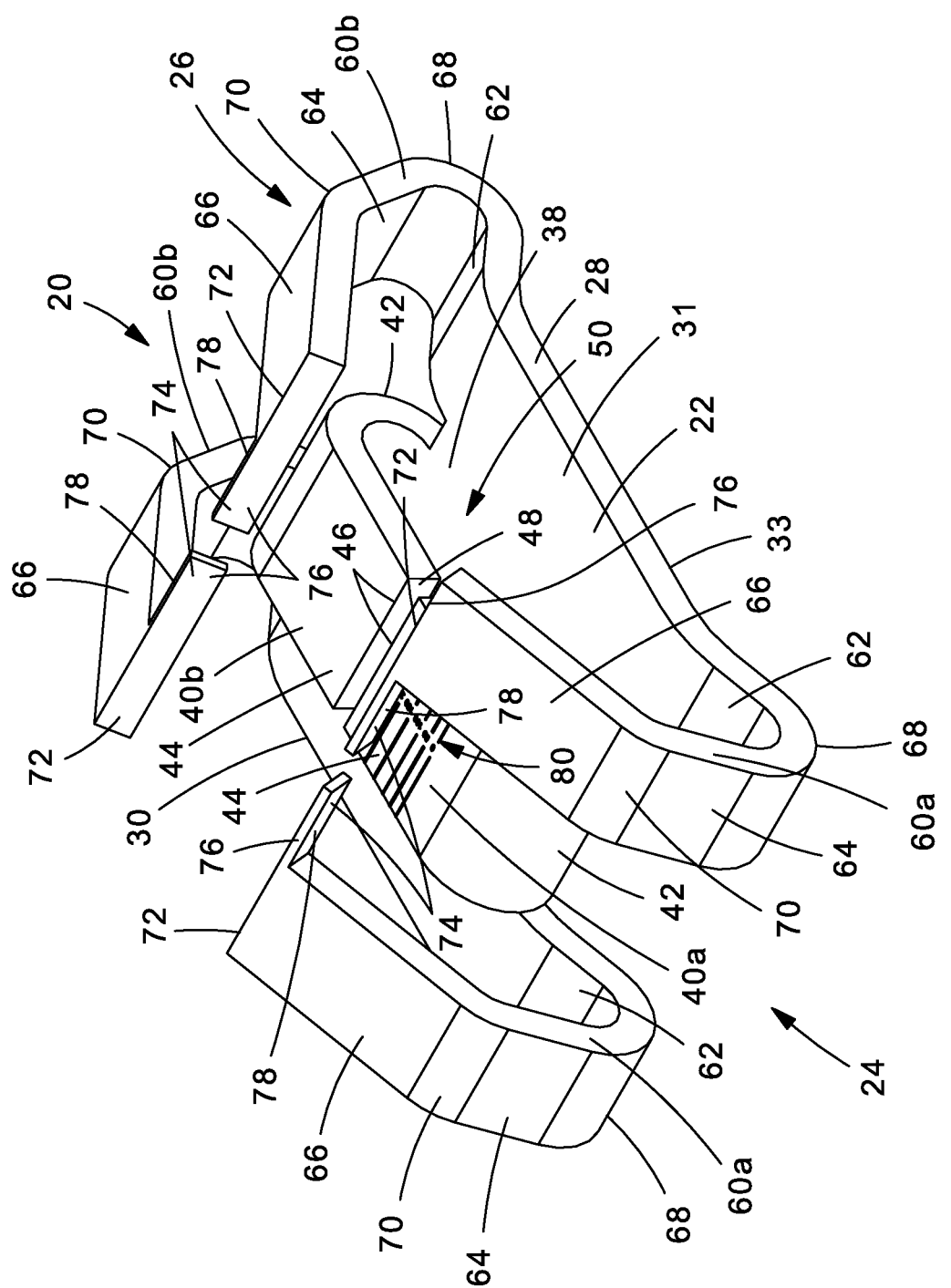
FIG. 3 depicts a top perspective view of only the indicator clip of FIG. 1.

FIG. 3 depicts a top perspective of the indicator clip 20 of FIG. 1. unattached to the cable tie 8. The indicator clip 20 includes a body 22. The body 22 includes a front 24, a back 26, a first side 28, and a second side 30. The body 22 also includes a top 31 and a bottom 33. The top 31 and bottom 33 of the body 22 are generally square shaped. The body 22 also includes a mid-section 38.

The midsection 38 is located in approximately the middle ⅓ of the body 22, extending from front 24 to the rear 26 of the body 22. The midsection 38 is planar and integral with the base 22. As depicted in FIG. 3, the midsection 38 includes retainers 40a and 40b that extend from the midsection 38 of the body 22. Retainer 40a extends from the front 24 of the body 22 and retainer 40b extends from the rear of the midsection 38. The retainers 40a, 40b include a bend 42 and an arm 44. The bend 42 includes a first end connected to the midsection 38. The bend 42 is a radiused section between the midsection 38 and the arm 44. The arm 44 is disposed over the midsection 38. A first end of the arm 44 is connected to the bend 42. A second end of the arm 44 extends over the midsection 38 of the body 22 toward a center of the body 22 terminating at an edge 46.

The arm 44 of retainer 40a and the arm 44 of the other retainer 40b extend toward each other, but do not contact each other. A gap 48 is formed between the edge 46 of the front 24 retainer 40a and the edge 46 of the rear 26 retainer 40b.

The area defined between the top 31 of the body 22 and the retainers 40a, 40b form a channel 50. The channel 50 may be slightly larger than the size of the strap body 10 of the cable tie 8. The channel 50 is configured to retain the strap body 10 of the cable tie 8 in a snug relationship as depicted in FIG. 2.

Located adjacent the midsection 38, on each of the first side 28 and second side 30, are front legs 60a and rear legs 60b. Front legs 60a are located at the front 24 of the body 22 on the first and second sides 28, 30. Rear legs 60b are located at the rear 26 of the body 22 on the first and second sides 28, 30.

The front legs 60a and rear legs 60b include a first extension 62, second extension 64, and third extension 66. A first bend 68 connects the first extension 62 to the second extension 64 and a second bend 70 connects the second extension 64 with the third extension 66.

The first extension 62 of each of front legs 60a and rear legs 60b are connected to the body 22. The first extension 62 extends away from the body 22 at a downward angle to the first bend 68. The first bend 68 may be in the range of 110 to 160 degrees, or any range sufficient to orient the second extension 64 over and above the first extension 62. The first bend 68 of each of the front and rear legs 60a, 60b are configured to support the body 22 on an application surface as described below.

The second extension 64 extends at an angle up from the first bend 68 inwards towards the body 22 and over the first extension 64. The second extension 64 supports the third extension 68 via the second bend 70. The second bend 70 may be in the range of 25 to 45 degrees, or any range sufficient to orient the third extension 66 over and above the body 22. The third extension 50 extends from the second bend 70 at an angle over and above the first extension 62 and a portion of the body 22. At an end of the third extension 66 is an edge 72. The edge 72 of the third extension 66 is free and unattached such that the edge 72 is configured to move when a force acts upon the legs 60a, 60b.

As further depicted in FIG. 3, pegs 74 extend from the edge 72 of the third extension 72 of each of the front and rear legs 60a, 60b. The pegs 74 extend inward over the midsection 38 at a right angle from a length of the third extension 72 at the edge 72. The pegs 74 are generally rectangularly shaped with a leading edge 76 and a trailing edge 78.

Depicted in FIG. 3, the pegs 74 extend over the arms 44 of the retainers 40a, 40b. Pegs 74 of the front 24 legs 60a extend over indicia 80 on the arm 44 of the front 24 retainer 40a. The pegs 74 correlate with the indicia 80 to represent a tension or pressure reading associated with the cable tie 8. The indicia 80 depicted in FIG. 3 are pounds per square inch (psi), however, other units of pressure or tension indicator marks may be used.

Figure 4:
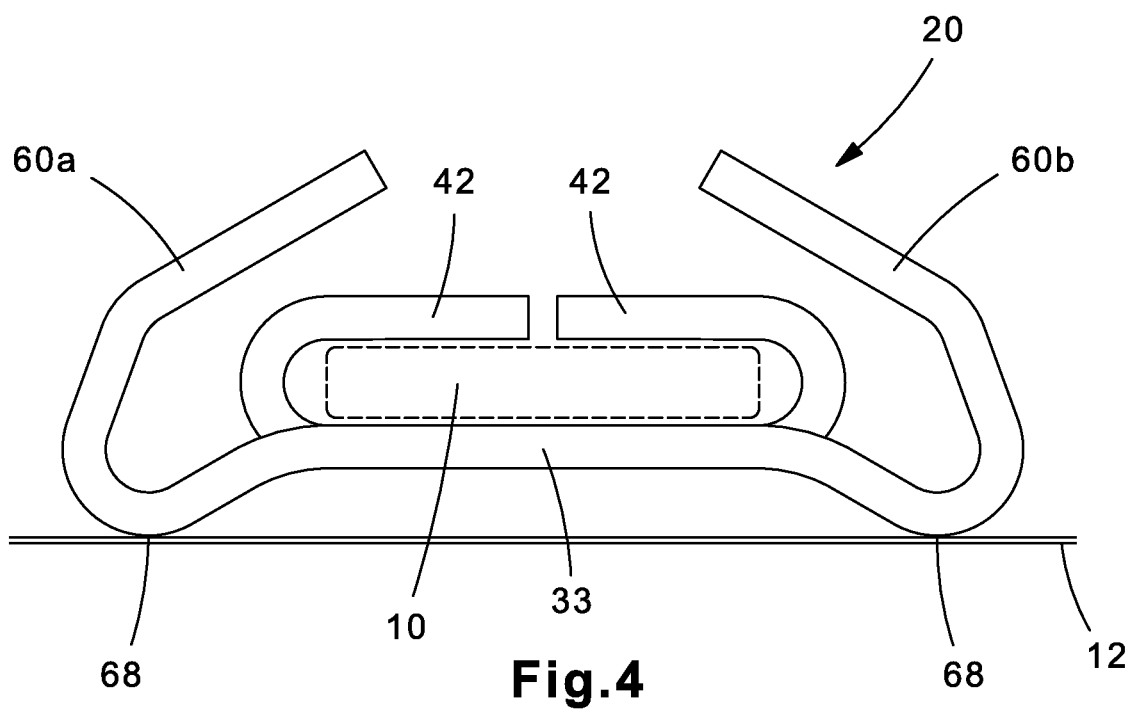
FIG. 4 depicts a side view of an example indicator clip.

FIG. 4 depicts an installed indicator clip 20 on the rubber boot 12 application surface of FIG. 1. The first bend 68 of each of the legs 60a, 60b is disposed upon the rubber boot 12. The indicator clip 20 of FIG. 4, is in a neutral position, where no tension is applied to the strap body 10 of the cable tie 8 and thus no force has been transferred to the indicator clip 20.

Figure 5:
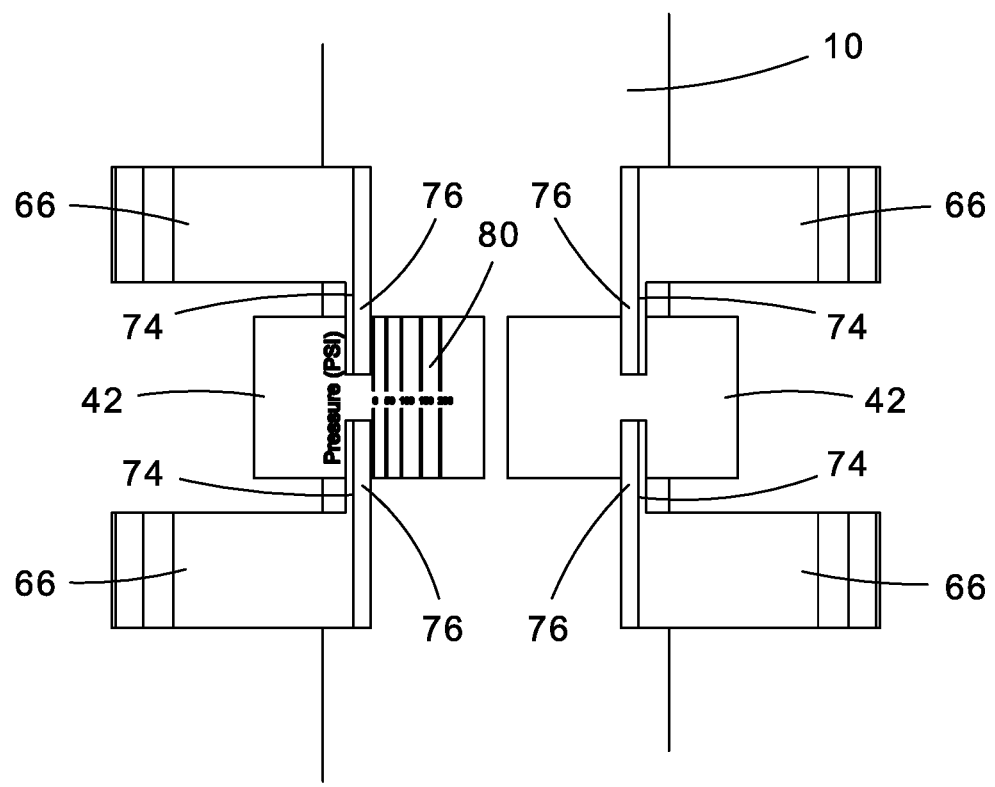
FIG. 5 depicts a top view of the indicator clip of FIG. 4 without a force applied.

FIG. 5 depicts a top view of FIG. 4. In FIG. 5, the leading edge 76 of the peg 74 is aligned over the indicia 80 of the front 24 retainer 40a. The front 24 pegs 74 alignment reflects any force being acted upon the indicator clip 20, which is a measure of any force acted upon the cable tie 8. The indicator clip 20 of FIG. 5 depicts a force reading of 0 psi. Accordingly, there is no force applied to the cable tie 8 of FIGS. 4 & 5.

Figure 6:
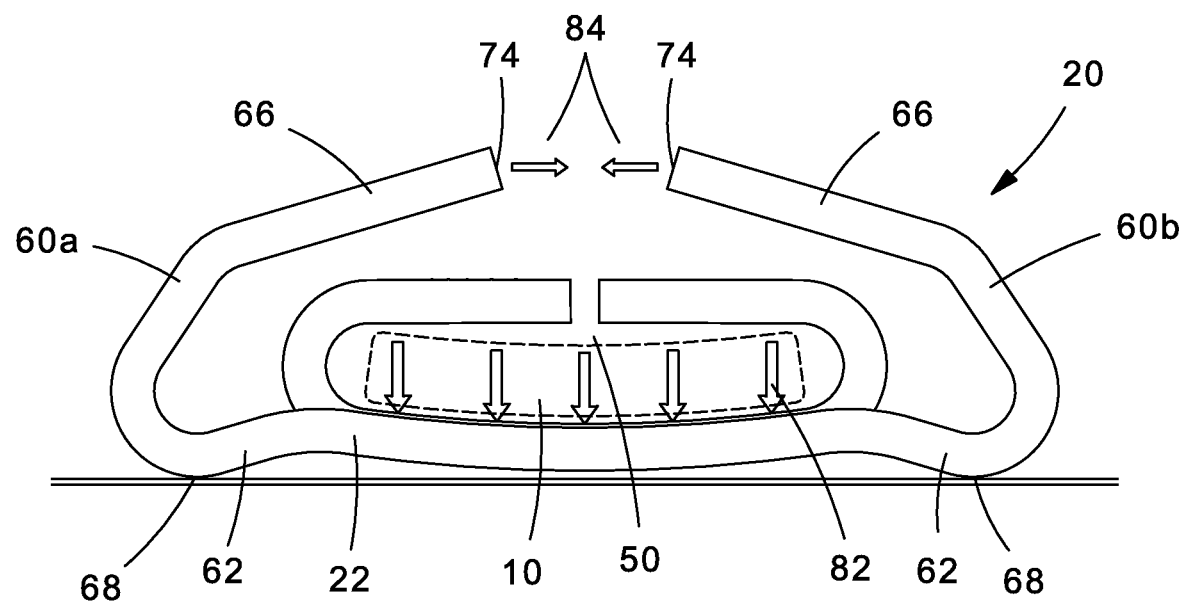
FIG. 6 depicts the side view of an example indicator clip with a force applied.

The indicator clip of FIG. 6 depicts a force (arrows 82) being applied to the indictor clip 20 by a tension force having been applied to the body strap 10 of the cable tie 8. As can be seen in FIG. 6, when a tension force is acted upon the body strap 10 within the channel 50 of the body 22, a downward force 82 acts upon the body 22 of the indicator clip 20. The force 82 is transferred through each of the legs 60a, 60b of the body 22 to the first bend 68. The force 82 causes the first extension 62 to deflect between the body 22 and the first bend 68. The deflection of the first extension 62 causes the legs 60a, 60b to pivot about the first bend 68. As the legs 60a, 60b pivot about the first bend 68, the third extensions 66 and pegs 74 deflect inward towards (arrows 84) the body 22 as depicted in FIG. 6.

Figure 7:
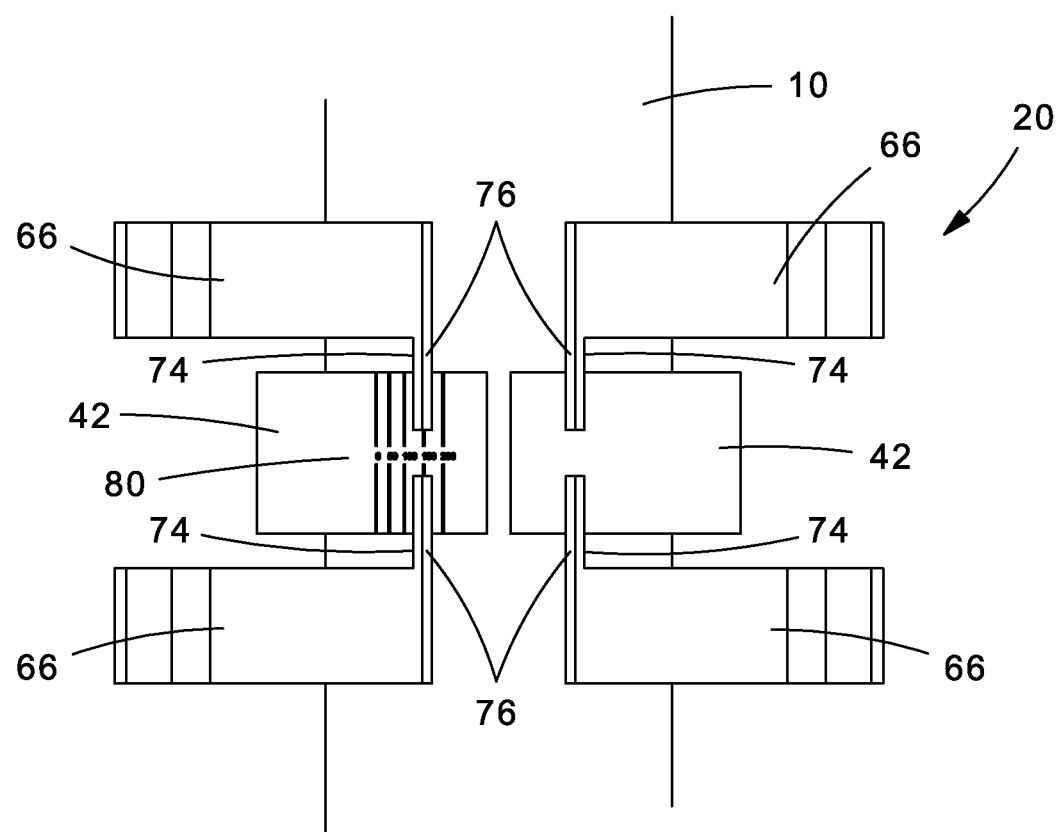
FIG. 7 depicts a top view of the indicator clip of FIG. 6 with a force applied.

FIG. 7 is a top view of the indicator clip 20 of FIG. 6 with the force 82 applied. The leading edge 76 of the front 24 pegs 74 is aligned over the indicia 80 of the front 24 retainer 40a. The aligned pegs 74 provides a force reading on the indicator clip 20 as applied to the cable tie 8. The indicator clip 20 of FIGS. 6 & 7 depicts a force reading of approximately 190 psi applied to the cable tie 8.

In use, a user inserts the strap body 10 of the cable tie 8 through the channel 50 of the indicator clip 20. The cable tie 8 is wrapped around the application for fastening. The indicator clip 20 is orientated so that the legs 60a, 60b face the application surface. The cable tie 8 may be initially tightened to retain the legs 60a, 60b on the application surface without inducing registerable tension in the cable tie 8 and a force on the indicator clip 20. A user may pull on a free end of the strap body 10 to tighten the cable tie 8. As the tension force increases in the cable tie 8, the cable tie 8 enacts the force 82 upon the indicator clip 20. A user may choose to continue to tighten the cable tie 8 until the desired tension in the cable tie 8 is reflected by the leading edge 76 over the indicia 80 of the indicator clip 20. A user may use their hand or a tool to tighten the cable tie 8. It is not necessary to use a cable tie installation tool to install and/or determine the tension or pressure in the cable tie 8. In instances where a reading is obtained from an indicator clip, the pressure reading may be used directly or converted into loop tensile given the cable tie geometry and radius of the application.

Once the cable tie 8 with the indicator clip 20 is installed, a user may continually monitor the tension of the cable tie 8 via the indicator clip 20. The indicator clip 20 will continually reflect the tension or pressure in the cable tie 8 without manipulating the indicator clip 20 or cable tie 8. A visual inspection by a user of the indicator clip will allow for a determination of the tension or pressure reading of the indicator clip 20 during the lifetime of the installation.

The indicator clip may be constructed of any suitable plastic or metal material. The size of the indicator clip may vary in size depending upon the size and application of the retention mechanism. It is contemplated that the indicator clip may be utilized with cable ties with different configurations than the cable tie depicted in FIG. 1, such as the cable tie disclosed in U.S. patent application Ser. No. 15/785,628 assigned to Panduit, which is hereby incorporated by reference in its entirety. It is further contemplated that the indicator clip may also be utilized with other retention mechanisms other than cable ties such as duct clamps, tension clamps, adjacent clamps, or hose clamps to determine the tension or pressure in an installed tie or clamp.

The illustrations of the embodiments described herein are intended to provide a general understanding of the structure of the various examples. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. An indicator clip for a retention mechanism comprising:
    a body including a channel configured to accept a strap of the retention mechanism, and
    at least one extension configured to deflect when a force is applied to the retention mechanism,
    wherein the indicator clip is configured to measure the force applied to the retention mechanism via measurements displayed on the body.

2. The indicator clip for a retention mechanism of claim 1, wherein the measurement displayed on the body are displayed by the at least one extension's orientation with indicia on the indicator clip.

3. The indicator clip for a retention mechanism of claim 1, wherein the at least one extension includes a portion disposed above the body.

4. The indicator clip for a retention mechanism of claim 3, wherein the portion of the at least one extension is configured to align with indicia on the body to display the measurements of force applied to the retention mechanism.

5. The indicator clip for a retention mechanism of claim 1, wherein the body includes a body portion and a retainer which form the channel, the retainer including indicia on a top surface, and
    wherein the at least one extension includes at least three extensions, projecting from the base at a side opposite of the channel and each of the at least three extensions including a portion extending over the base and above a portion of the channel, and
    wherein one of the portions of one of the at least three extensions aligns with the indicia to measure the force applied to the retention mechanism.

6. A fastening system, the system comprising:
    a retention mechanism including a strap and a head, the head configured to accept the strap and retain the strap in a fixed position,
    an indicator clip including a body and at least one extension, the indicator clip configured to measure a force applied to the retention mechanism, wherein the body is configured to accept a strap of the retention mechanism and the at least one extension is configured to deflect when the force is applied to the retention mechanism, and
    wherein the measurement of the force applied to the retention mechanism is provided via measurements displayed on the body.

7. The fastening system of claim 6, wherein the measurement displayed on the body are displayed by the at least one extension's orientation with indicia on the indicator clip.

8. The fastening system of claim 6, wherein the at least one extension includes a portion disposed above the body.

9. The fastening system of claim 8, wherein the portion of the at least one extension is configured to align with indicia on the body to display the measurements of force applied to the retention mechanism.

10. A method of determining a force applied to a retention mechanism, the method comprising:
    inserting a strap of the retention mechanism in a channel of an indicator clip,
    disposing the retention mechanism and indicator clip on an application,
    inserting the strap of the retention mechanism into a head of the retention mechanism and applying a force to an end of the strap to tighten the retention mechanism around the application, and
    determining the force applied to the retention mechanism as measured by indicia displayed on a body of the indicator clip.

\* \* \* \* \*